March 26, 1929.  R. RÜDENBERG  1,707,142
MERCURY VAPOR RECTIFIER PLANT
Filed July 2, 1926
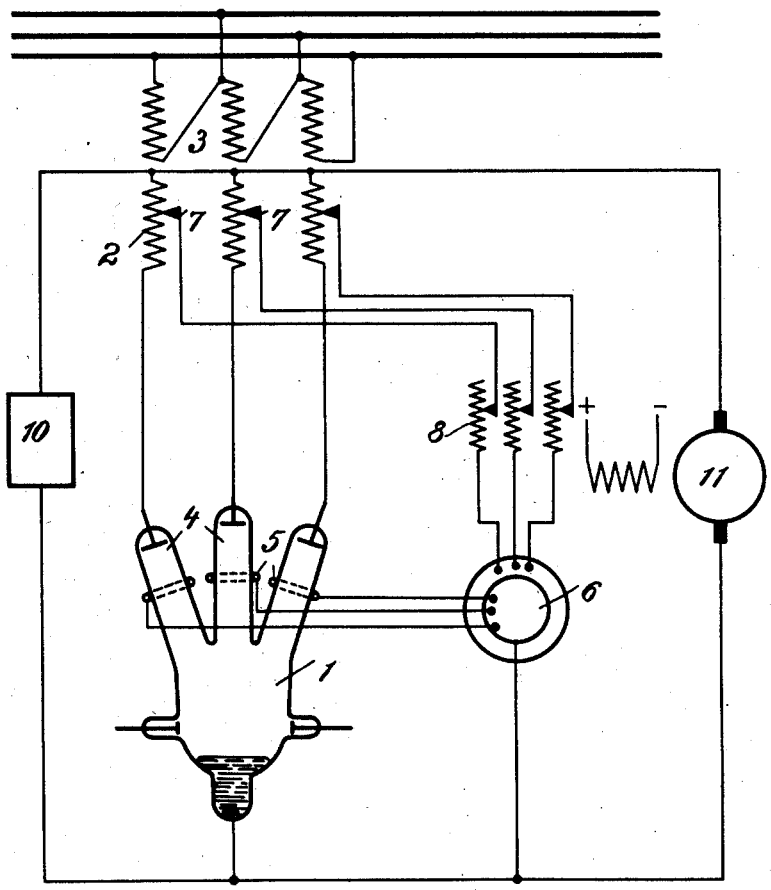
Inventor
Reinhold Rüdenberg
by Knight Bros.
attorneys Patented Mar. 26, 1929.

1,707,142

UNITED STATES PATENT OFFICE.

REINHOLD RÜDENBERG, OF BERLIN-GRUNEWALD, GERMANY, ASSIGNOR TO SIEMENS-SCHUCKERTWERKE GESELLSCHAFT MIT BESCHRANKTER HAFTUNG, OF SIEMENS-STADT, NEAR BERLIN, GERMANY, A CORPORATION OF GERMANY.

MERCURY-VAPOR RECTIFIER PLANT.

Application filed July 2, 1926, Serial No. 120,192, and in Germany June 27, 1925.

My invention relates to mercury vapor rectifier plants.

In mercury vapor and similar rectifiers it is for some purposes desirable to balance or equalize as far as possible the current surges or remaining alternating current components of the direct current delivered by the rectifier.

The object of my invention is to provide means for attaining this result in a simple manner.

According to my invention I place static or electro-dynamic condensers in circuit between the star point of the transformer usually connected in series with the rectifier and the cathode of the rectifier, in other words in parallel to the direct current consumer circuit.

Static condensers come into consideration mainly for small currents and high continuous current voltages. For the calculation of the condensers the following formula holds good: $C = \dfrac{\tau J}{\epsilon E}$. In this formula $\tau$ represents the periodicity of the alternating current to be rectified, $J$ the current and $E$ the voltage on the direct current side of the rectifier. $\epsilon = o/E$ represents the voltage fluctuations still remaining after the balancing or the equalization of the rectified alternating current.

For low voltages and large currents static condensers become too large. Electro-dynamic condensers, such as separately excited direct current dynamos, may then be employed. The armature of the direct current dynamo is connected in parallel relation to the consumer circuit of the mercury arc rectifier and the excitation field coils are connected with a direct current source not subject to fluctuations, such as a storage battery. The active capacity of the direct current machine is hereby determined by the relation, $$\varphi dyn = \dfrac{\Theta g \omega_o^2}{E^2}$$

Herein $g$ represents the acceleration of gravity, $\Theta$ the moment of inertia, $\omega_o$ the normal frequency of the armature and $E$ its voltage.

The parallel connection of condensers according to my invention is particularly suitable for rectifier plants in which in or around the discharge chambers of the individual anodes control electrodes are provided which are excited by single-phase or multi-phase current. The anode current or also the voltage on the direct current side of the rectifier can then be regulated by the excitation of the control electrodes. It has been ascertained that in such a system the regulating capacity of the control electrodes is not reduced by the parallel connection of condensers, as is the case when choke coils are placed in the direct current circuit.

The drawing affixed hereto illustrates an embodiment of my invention. The drawing shows the diagram of a three-phase mercury arc rectifier plant.

Referring to this figure, 1 is a three-phase mercury vapor rectifier fed by the secondary winding 2 of a transformer 3 in the usual manner. Around the anode bulbs 4 of the rectifier receptacle are placed three annular control electrodes 5. These control electrodes are excited by an induction voltage regulator 6. The regulator is connected with the secondary windings 2 of the transformer 3 by means of adjustable current taps. By adjusting the rheostats 8 connected in series with the induction regulator or by adjusting the induction regulator the voltage at the control electrodes 5 may be regulated in value and phase. In this manner the direct current voltage delivered by the rectifier may then likewise be controlled. In order to reduce as far as possible the current fluctuations at the direct current side a separately excited direct current dynamo 11 is connected in parallel relation to the consumer 10 to act as electro-dynamic condenser.

Various modifications and changes may be made without departing from the spirit and the scope of the invention, and I desire, therefore, that only such limitations shall be placed thereon as are imposed by the prior art.

I claim as my invention:—

1. In a multiphase alternating current rectifier system in combination a mercury arc rectifier having a cathode and a plurality of anodes, a transformer having the ends of its secondary windings connected respectively to said anodes and the neutral point of said windings to said cathode, a direct current consumer disposed in said cathode-neutral point connection to receive rectified current, electrodynamic means connected to said cathode and said neutral point for introducing a capacitative reactance effect, said rectifier having separate discharge spaces for said anodes, an annular control electrode for each anode surrounding its anode space, and means for energizing said control electrodes by alternating current in suitable phase relation to the alternating current supplied to the rectifier.

2. In a multiphase alternating current rectifier system in combination a mercury arc rectifier having a cathode and a plurality of anodes, a transformer having the ends of its secondary windings connected respectively to said anodes and the neutral point of said windings to said cathode, a direct current consumer disposed in said cathode-neutral point connection to receive rectified current, electrodynamic means connected to said cathode and said neutral point for introducing a capacitative reactance effect, said rectifier having separate discharge spaces for said anodes, an annular control electrode for each anode surrounding its anode space, and an induction voltage-phase regulator connected to the secondary windings of said transformer and to said control electrodes for energizing the latter at the proper voltage and in proper phase relation to the alternating current supplied to the rectifier.

In testimony whereof I affix my signature.

REINHOLD RÜDENBERG.